United States Patent
Brahma

(10) Patent No.: US 11,909,920 B2
(45) Date of Patent: Feb. 20, 2024

(54) CONVERGED VOICEMAIL PROVISIONING AND FQDN BASED VOICEMAIL CALL ROUTING

(71) Applicant: T-Mobile USA, Inc., Bellevue, WA (US)

(72) Inventor: Dhurjati Brahma, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 285 days.

(21) Appl. No.: 17/520,607

(22) Filed: Nov. 5, 2021

(65) Prior Publication Data
US 2023/0141097 A1   May 11, 2023

(51) Int. Cl.
*H04M 3/533*   (2006.01)
(52) U.S. Cl.
CPC ..................... *H04M 3/533* (2013.01)
(58) Field of Classification Search
CPC ...................................... H04M 3/533
See application file for complete search history.

(56) References Cited

U.S. PATENT DOCUMENTS

| | | | | |
|---|---|---|---|---|
| 8,428,563 B2 * | 4/2013 | Hao | ...................... | H04M 3/537 379/88.13 |
| 11,259,160 B1 * | 2/2022 | Belser | ..................... | H04W 8/26 |
| 2004/0252815 A1 * | 12/2004 | Lennox | .................. | H04M 3/533 379/88.16 |
| 2005/0094779 A1 * | 5/2005 | Kleinfelter | ............ | H04M 3/537 379/88.17 |
| 2008/0205603 A1 * | 8/2008 | Allison | .................... | H04W 4/02 379/88.12 |
| 2010/0151831 A1 * | 6/2010 | Hao | .................. | H04M 3/53325 455/412.2 |

\* cited by examiner

*Primary Examiner* — Brenda H Pham
(74) *Attorney, Agent, or Firm* — Lee & Hayes P.C.

(57) ABSTRACT

Systems and methods for selectively routing an unanswered communication session to a voicemail system based at least on a voicemail system identifier (FQDN) mapped to a voicemail pilot number (present within the voicemail routing profile) are described herein. The system generates the voicemail routing profile in response to a provisioning request that identifies one or more messaging services, including a voicemail service, that are to be provided to a user profile. The voicemail profile is stored within a database that is accessed to obtain the voicemail routing profile when a user device registers with a communication network and is associated with the user profile. The system utilizes internal lookup tables and repository functions to identify the voicemail system associated with the user profile and the voicemail routing profile in response to a communication session being unanswered. The system can route the communication session to the voicemail system based at least on the voicemail system identifier mapped to the voicemail pilot number present within the voicemail routing profile.

20 Claims, 7 Drawing Sheets

CONVERGED VOICEMAIL PROVISIONING AND FQDN BASED VOICEMAIL CALL ROUTING

BACKGROUND

Presently, provisioning of message services, including voicemail, is accomplished via a variety of communication network nodes that cause extended response times and inconsistencies in backend databases. Additionally, the variety of communication network nodes utilized to accomplish provisioning and routing utilize voicemail node-specific pilot numbers for routing calls within the network. In previous architectures, the communication network nodes and voicemail node-specific pilot numbers were utilized due to the provisioning of voicemail user profiles to the various network nodes with individualized backend databases within the communication network. Accordingly, a voicemail router was utilized to provision the correct routing information based on the individual voicemail nodes situated in different geographical locations associated with communication sessions in an attempt to effectively distribute calls. However, the distributed use of network nodes for provisioning and routing can result in reduced session quality, extended response times, and errors in the communication session information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
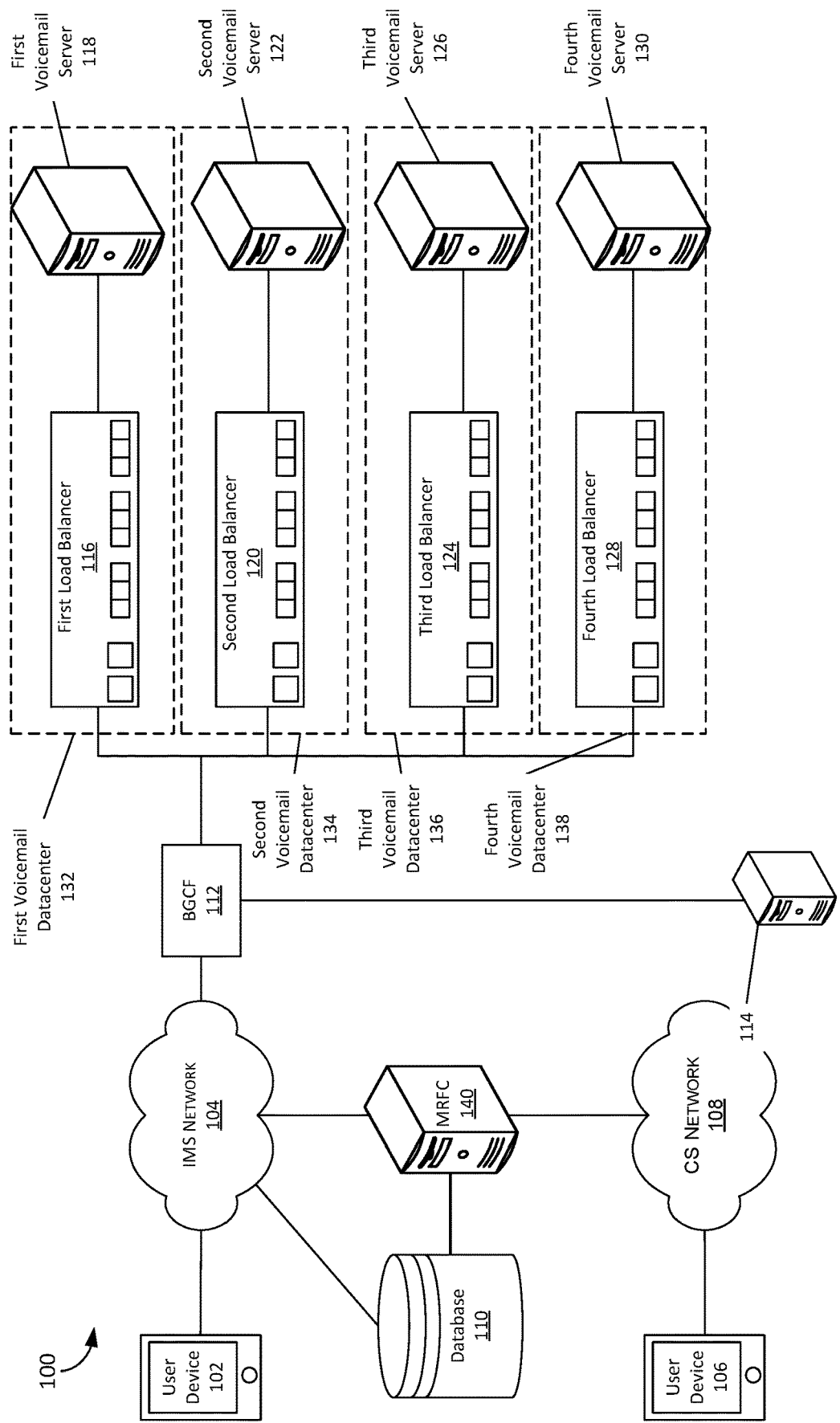
FIG. 1 illustrates a network that includes both packet switched and circuit switched networks that utilize 2G, 3G, 4G, and 5G infrastructure to receive communication session requests from user devices and forward unanswered communication session requests to a voicemail system.

This disclosure describes systems, devices, and techniques for optimizing provisioning services and call routing features for a converged messaging system that utilizes a unified backend database to route communication sessions to the desired endpoint. More specifically, communication sessions can be routed to any voicemail system associated with a communication network based at least on information stored in association with user profiles, services profiles, and/or communication sessions by a database associated with the communication network. Additionally, provisioning services can be consolidated such that provisioning is accomplished via a provisioning request that is processed by a web services gateway (WSG) and provisioned via a provisioning gateway (PGW). Accordingly, a dedicated voicemail router that is configured to manage routing of communication sessions and provisioning can be removed from the communication network. Further, control functions associated with routing communication sessions can utilize a fully qualified domain name (FQDN) to determine routing for the communication sessions within the communication network. By enabling the control functions utilize the FQDN to identify routing for communication sessions to deposit voicemails, the communication network enables a breakout control function and a unified database to handle routing requests for voicemails. It should be noted that the described systems, devices, and techniques may be configured to store voicemail routing information and provisioning information for a user profile and/or a services profile that is associated with any network infrastructure including, but not limited to, third generation (3G), fourth generation (4G), fifth generation (5G), and future generations of networks.

In some examples, the systems, devices, and techniques described herein improve the efficiency and functionality of a network by enabling a breakout control function to obtain and provide routing information for directing communication sessions to the appropriate voicemail systems. In particular, a FQDN can be allocated for the voicemail system that enables the breakout control function to direct the communication session to individual voicemail systems via a global traffic manager (GTM), a load balancer, and/or other traffic managing systems. Additionally, a voicemail datacenter may include one or more voicemail systems or deposit endpoints that communication sessions are directed to by a load balancing node. The one or more voicemail systems or the deposit endpoints may include voicemail databases where voicemails are deposited and stored for a user device. Further, the voicemail systems can be unified voicemail systems that are configured to receive voicemails intended for a class of users (e.g., enterprise users, consumer users, etc.). Accordingly, the breakout control function can be configured to receive the communication session that was unanswered by a user device, determine an endpoint for the communication session based on the FQDN, and route the communication session via the global traffic manager and the load balancing node to the endpoint associated with the voicemail system.

In some examples, the systems, devices, and techniques described herein improve the efficiency and functionality of a network by enabling provisioning engine to provision services, via a WSG and for a user profile, for short message service (SMS), multimedia message service (MMS), rich communication service (RCS), voicemail service, and other services provided by the communication network. Similarly, the provisioning engine provisions, via a PGW, a voicemail routing profile that assigns and/or associates a voicemail service profile associated with the services profile with voicemail routing information. Additionally, the WSG can be configured to perform queries and/or updates for the user profile regarding the services provisioned by the provisioning engine. Further, the PGW can be configured to populate the services profile and databases associated with the services provisioned by the provisioning engine with indications of the FQDN, voicemail objects, and other information associated with the services. It should be noted that the WSG functions as a consolidated provisioning node within the communication network that is configured to handle provisioning for services that were previously handled by distributed network nodes. Accordingly, the WSG can be configured to receive indications of service provisions from the provisioning engine and cause appropriate network resources to allocate the services for the user profile associated with the service provisions.

FIG. 1 is a block diagram illustrating a network 100 according to some examples. Network 100 can contain network infrastructure associated with 2G, 3G, 4G, and 5G networks. Additionally, network 100 is not limited to the depicted network nodes and may include additional access networks, network nodes, and network functions not depicted by the diagram. Further, network 100 may comprise additional network infrastructures and nodes not illustrated by FIG. 1. In an example, the user device 102 can access the IMS network 104 where 4G and 5G infrastructure handles a communication session. The IMS network 104 can include serving gateways, packet gateways, mobility management entities, proxy call session control functions, other control functions, access networks, and other network nodes. Similarly, the user device 106 can access the CS network 108 where 2G and 3G infrastructure handles the communication session. The CS network 108 can include serving GPRS support nodes, gateway GPRS support nodes, and other associated network nodes and access networks. While network 100 can utilize 2G, 3G, 4G, and 5G network infrastructure, network 100 is not limited to the illustrated examples and may utilize alternative network infrastructures including wireless local area networks, local area networks, wide area networks, digital subscriber line networks, and other types IP connectivity access networks (IP-CAN).

In some examples of FIG. 1, a communication session between the user device 102 and a target device can result in the communication session going unanswered, resulting in a voicemail deposit request being issued by the IMS network 104. In particular, the user device 102 can issue a communication session request for the target device that is transmitted to the IMS network 104. The IMS network can receive the communication session request, initialize the communication session, and attempt to complete the communication session with the target device. Additionally, the target device can accept the communication session request, forming the communication session and ending the workflow, or reject the request. It should be noted that rejection of the communication session request can be an affirmative indication of rejection or a lack of response to the communication session request. Accordingly, the IMS network can determine that the communication session was rejected by the target device and proceed to deposit a voicemail associated with the communication session.

In some examples, the network 100 can include a database 110 that is configured to store service information for one or more service profiles that are associated with one or more user devices. In particular, the service information can be provisioned for the voicemail routing service profile associated with the services profile and include voicemail routing (VMR) services information, a voicemail pilot number, a voicemail platform ID, and other profile information. Additionally, the services profile can be stored by the database 110, populated with the service information during provisioning of the service profile, accessed by an application server (e.g., a telephony application server) in the IMS network 104, and utilized by the application server to register the user device 102 with the IMS network 104. More specifically, and during registration of the user device 102 with the IMS network 104, the application server of the IMS network 104 can be configured to query the database 110 and/or an additional database associated with the IMS network for the service information and allocate the service information to the services profile based at least on a query response issued by the database 110 (or the additional database). Further, the IMS network 104 can assign a voicemail system or domain (e.g., enterprise voicemail, consumer voicemail, etc.) that is mapped to a voicemail pilot number and a voicemail server to the voicemail routing services profile associated with the services profile based at least on the query response issued by the database 110. The service information provided by the database 110 can be determined based at least on a subscription associated with the services profile. Accordingly, the query transmitted by the application server can include indications from the services profile and cause the database 110 to return the service information for association with the services profile.

In at least one example, the database 110 can be a unified subscriber database (USD) and a home subscriber server (HSS). Additionally, the application server associated with the IMS network 104 can be a telephony application server (TAS) that is configured to transmit a Subscribe-Notifications-Request (SNR) query to the USD-HSS database to retrieve the service information, wherein the service information includes VMR-Services information that includes a voicemail pilot number and a voicemail platform ID. Further, the USD-HSS database can be configured to return the VMR-Services information that includes a voicemail pilot number, wherein the voicemail pilot number can specify a type of voicemail system (consumer or enterprise) that is to receive voicemails for the user device 102, a voicemail site where voicemails are to be deposited, and other information associated with the voicemail services provisioned for the user device 102 and stored by the voicemail routing services profile associated with the services profile. The USD-HSS database response to the SNR query can be a Subscribe-Notifications-Answer (SNA) response. Accordingly, the user device 102 and the services profile can be registered with the IMS network 104 based at least on the information stored in the database 110. Further, the voicemail pilot number, voicemail platform ID and other VMR-Services information can be stored by the database 110 as a voicemail routing profile that is configured to store voicemail routing information, including the voicemail pilot number, in association with the voicemail routing services profile associated with the services profile.

In at least one additional example, the service information can include the voicemail pilot number that is associated with the voicemail service that has been provisioned for the services profile by the provisioning engine. In particular, the voicemail pilot number can enable a breakout gateway control function (BGCF) 112 to identify a FQDN and route the communication session to the voicemail system or domain allocated to receive the voicemail from the communication session. As previously noted, the voicemail system or domain can be associated with enterprise users, consumer user, and/or other categories of users that are provisioned voicemail services. Accordingly, the query response transmitted by the database 110 can map to the FQDN that is associated with the category of users indicated by the services profile and the FQDN can be configured to trigger routing of a rejected communication session to the appropriate voicemail system.

In some examples, the services profile can be associated with the user device 102 and/or the subscription associated with the user and/or the user device 102. In particular, the services profile can be stored by the database 110 to define, for the IMS network 104, network services that may be access by and/or provided for the user device 102. Additionally, the service profile can include sub-profiles that are specific to individual services that are provided by the IMS network 104. For example, and as noted above, the service profile can include a voicemail routing services profile that provides the services information that is relevant to the voicemail routing services accessible by the user device 102. The voicemail routing services profile can include information regarding routing information, pilot number(s), platform identifiers for the voicemail system, and other related information. Further, the service profile can include other sub-profiles such as a IMS profile, an MMTEL profile, a voice call profile, and general information regarding services provided via the IMS network (e.g., a service provider, a home network, etc.). Accordingly, the services profile can be provisioned to the database 110 to define the services of the IMS network 104 that may be accessed by the user device 102 and handling for the communication sessions established for the user device 102.

In some examples, the user device 102 can be associated with the services profile and a user profile. In particular, the services profile is stored in the database 110 to define, for the IMS network 104, the network services (e.g., services including IMS, MMTEL, voice calls, voicemail services, etc.) that are provided for the user device 102 and the handling of communication sessions initiated by and received by the user device 102. Additionally, the user profile can be configured to define, for the network services that are provided for the user device 102, network features, messaging features, storage capabilities, and other network service functionalities that may be provided for the user device 102. Further, the user profile can be configured to store user information that includes at least a user class associated with the user profile and the services profile. Accordingly, the user profile can be utilized to define service features that are to be provided for the user device 102 by the IMS network 104.

In some examples of FIG. 1, the network 100 can include a breakout gateway control function (BGCF) 112 that is configured to handle the communication session after the communication session request has been rejected by the target device. In particular, the BGCF 112 can be a control function within the IMS network 104 that the communication session is routed to after rejection of the communication session request for deposition of the voicemail. Additionally, the BGCF 112 can be configured to obtain the pilot number from the communication session request and/or the voicemail routing services profile associated with the communication session to perform an internal lookup to determine the FQDN and/or destination that is associated with the pilot number. Further, the BGCF 112 can utilize the FQDN to transmit a query to a repository function 114, requesting routing information for the communication session. Accordingly, the BGCF 112 can be configured to receive the communication session after rejection of the communication session request by the target device, wherein the communication session is routed to the BGCF 112 by network nodes of the IMS network 104.

In some examples of FIG. 1, the network 100 can include the repository function 114 that is configured to receive and respond to requests and queries directed to the FQDN or other identifier. In particular, the repository function 114 can be a Domain Name Server (DNS), a network repository function (NRF), or other server associated with the communication network 100 that is configured to store routing information associated with the voicemail systems. For example, the repository function 114 can be configured to store IP addresses, virtual IPs (VIPs), and other information associated with the voicemail systems. Additionally, the repository function can be configured to store a routing policy that determines a basis for selecting voicemail system servers that the communication session can be routed to be the BGCF 112. Accordingly, the repository function can select the voicemail system that the communication session will deposit the voicemail to and transmit the routing information for the voicemail system to the BGCF 112.

In at least one example, the repository function 114 can be configured to select a voicemail server of the voicemail system to receive the communication session based at least on a utilization of the one or more voicemail servers associated with the voicemail system. In particular, the BGCF 112 can transmit a query that includes the FQDN and indications of the category of user associated with the voicemail routing services profile and the communication session to the repository function 114, wherein the FQDN identifies the voicemail system associated with the category of user and, by extension, the voicemail routing services provisioned for the services profile based on the category of user. Additionally, the repository function can be configured to receive indications of or otherwise monitor the utilization of the voicemail servers associated with the voicemail system. More specifically, the voicemail system can include one or more voicemail servers that are individually configured to receive the communication session request rejected by the target device, establish the communication session with the user device 102, and receive the voicemail generated by the user device 102. Further, as this may occur for a plurality of user devices at a given moment in time, the voicemail servers may be configured such that a plurality of voicemails are received from a plurality of user devices and individual voicemail servers may be associated with lower utilization than other voicemail servers. Accordingly, the repository function 114 may be configured to receive indications of voicemail server utilization, determine a voicemail server that is associated with a voicemail server utilization that is less than a threshold utilization, a percentage of the total voicemail servers associated with the voicemail system, and/or other threshold that indicates that the voicemail server is available to receive the communication session.

In at least one additional example, the repository function 114 can be configured to select the voicemail server of the voicemail system to receive the communication session based at least on an allocation algorithm. In particular, the allocation algorithm can be a method for identifying the voicemail server based on the routing of previous communication sessions to the voicemail system. Additionally, the allocation algorithm can track routing the previous communication sessions and determine the voicemail server based at least on the voicemail server having a number of active communication sessions below a threshold value, being the voicemail server that has not receive a communication in the longest period of time (e.g., other voicemail servers have received communication sessions since the voicemail server received a previous communication session), being identified at random, and/or otherwise being identified by the repository function. Accordingly, the repository function 114 can be configured to identify the voicemail server and return routing information for the voicemail server to the BGCF 112 based on the allocation algorithm.

In at least one further example, the query transmitted by the BGCF 112 can be a Name Authority Point (NAPTR) query that is configured to trigger FQDN resolution by the repository function. More generally, the query transmitted by the BGCF 112 to the repository function 114 can be configured to cause the repository function 114 to identify the voicemail system identified by the FQDN and the voicemail server that will receive the voicemail from the communication session. Additionally, the determination of the voicemail server can be accomplished by a Global Traffic Manager (GTM) of the repository function 114 that is configured to receive the query and generate the query response. The query response can include the routing information (e.g., IP address, VIP, etc.) that is transmitted to the BGCF 112 for routing the communication session.

In some examples, the BGCF 112 can receive the query response from the repository function and route the communication session to the voicemail server identified by the query response. In particular, the BGCF 112 can be configured to route the communication session to the first consumer load balancer 116, the first enterprise load balancer 120, the second consumer load balancer 124, or the second enterprise load balancer 128. Additionally, the load balancers (e.g. the first consumer load balancer 116, the first enterprise load balancer 120, the second consumer load balancer 124, and the second enterprise load balancer 128) can be configured to then direct the communication session to a first consumer server 118, a first enterprise server 122, a second consumer server 126, or a second enterprise server 130. It should be noted that the repository function 114 can be configured to store the first consumer load balancer 116 and the first consumer server 118 as a first voicemail datacenter 132, the first enterprise load balancer 120 and the first enterprise server 122 as a second voicemail datacenter 134, the second consumer load balancer 124 and the second consumer server 126 as a third voicemail datacenter 136, and the second enterprise load balancer 128 and the second enterprise server 130 as a fourth voicemail datacenter 138. Further, the repository function 114 can be configured to store routing information specific to the individual load balancers for routing communication sessions to the voicemail systems.

In some examples, the user device 106 can be registered with the CS network 108. It should be noted that the CS network 108 is a circuit switched network that utilizes 2G and 3G network technology to handle communication sessions. In contrast, the IMS network 104 is an IP Multimedia Subsystem network that utilizes packet switching technology and 4G/5G network technology to handle communication sessions. As the BGCF 112 and the repository function 114 can be associated with the IMS network 104 to consolidate provisioning and voicemail routing, a Media Gateway Control Function (MGCF) can be configured to receive an additional communication session, associated with the CS network 108, that is associated with an additional communication session request that has been rejected by the target device. Additionally, the MGCF can be a control function of the CS network 108 that is configured to route the additional communication session to a Media Resource Function Controller (MRFC) 140 that is configured to communicate with both the IMS network 104 and the CS network 108.

In some examples, the MRFC 140 can be configured to receive the additional communication session rejected by an additional target device and determine an additional pilot number for depositing an additional voicemail with an additional voicemail datacenter. In particular, the MRFC 140 can be configured to transmit a diameter request to the database 110, the diameter request causing the database 110 to respond to the MRFC 140 with an additional pilot number for the additional communication session. Similar to above, the additional pilot number is associated with an additional voicemail system that the additional communication session is to be routed based on the voicemail routing services profile associated with the services profile associated with the additional communication session. Further, the additional request response from the database 110 can include the additional pilot number for the additional communication session. Accordingly, the MRFC 140 can forward the additional communication session and the additional pilot number to the BGCF 112.

In some examples, the MRFC 140 can forward the additional communication session and cause the BGCF 112 to determine a FQDN associated with the additional voicemail system allocated to receive the additional communication. In particular, the MRFC 140 can forward the additional pilot number to the BGCF 112 and trigger an internal lookup that determines the FQDN associated with the additional voicemail system. Additionally, the BGCF 112 can proceed to transmit a query to the repository function 114 for routing information associated with the additional voicemail system, wherein the repository function can generate a query response as discussed above. For example, the repository function 114 can be configured to identify the additional voicemail system associated with the FQDN, select a voicemail datacenter for the additional communication session, and generate the query response that includes routing information for the voicemail datacenter. Further, the repository function 114 can transmit the query response to the BGCF 112 and cause the BGCF 112 to route the additional communication session to the voicemail datacenter for deposit of a voicemail.

Accordingly, the network 100 can be configured to receive communication sessions that are rejected and/or not accepted by a target user device and route the communication sessions through a consolidated voicemail routing system that utilizes the BGCF 112 and the repository function 114 to identify and route the communication sessions to the appropriate voicemail datacenter.

It should be noted that the user device 102 and the user device 106 can be any suitable computing device configured to communicate over a wireless and/or wireline network with the user side packet core and/or the network core of network 100. The user device 102 and the user device 106 can be any suitable computing device, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a network digital camera, a global positioning system (GPS) device, and/or other similar mobile devices. Although this description predominantly describes the user device 102 and the user device 106 as being "mobile" or "wireless," (e.g., configured to be carried and moved around), it is to be appreciated that the user device 102 and the user device 106 may represent various types of communication devices that are generally stationary as well, such as televisions, desktop computers, game consoles, set top boxes, and the like. In this sense, the terms "communication device," "wireless device," "wireline device," "mobile device," "computing device," "terminal," "user equipment," and "user device" may be used interchangeably to describe the user device 102 and the user device 106 capable of performing the techniques described herein. In some examples, user device 102 and the user device 106 can have one or more capabilities that require a connection to a control function having one or more functionalities.

Figure 2:
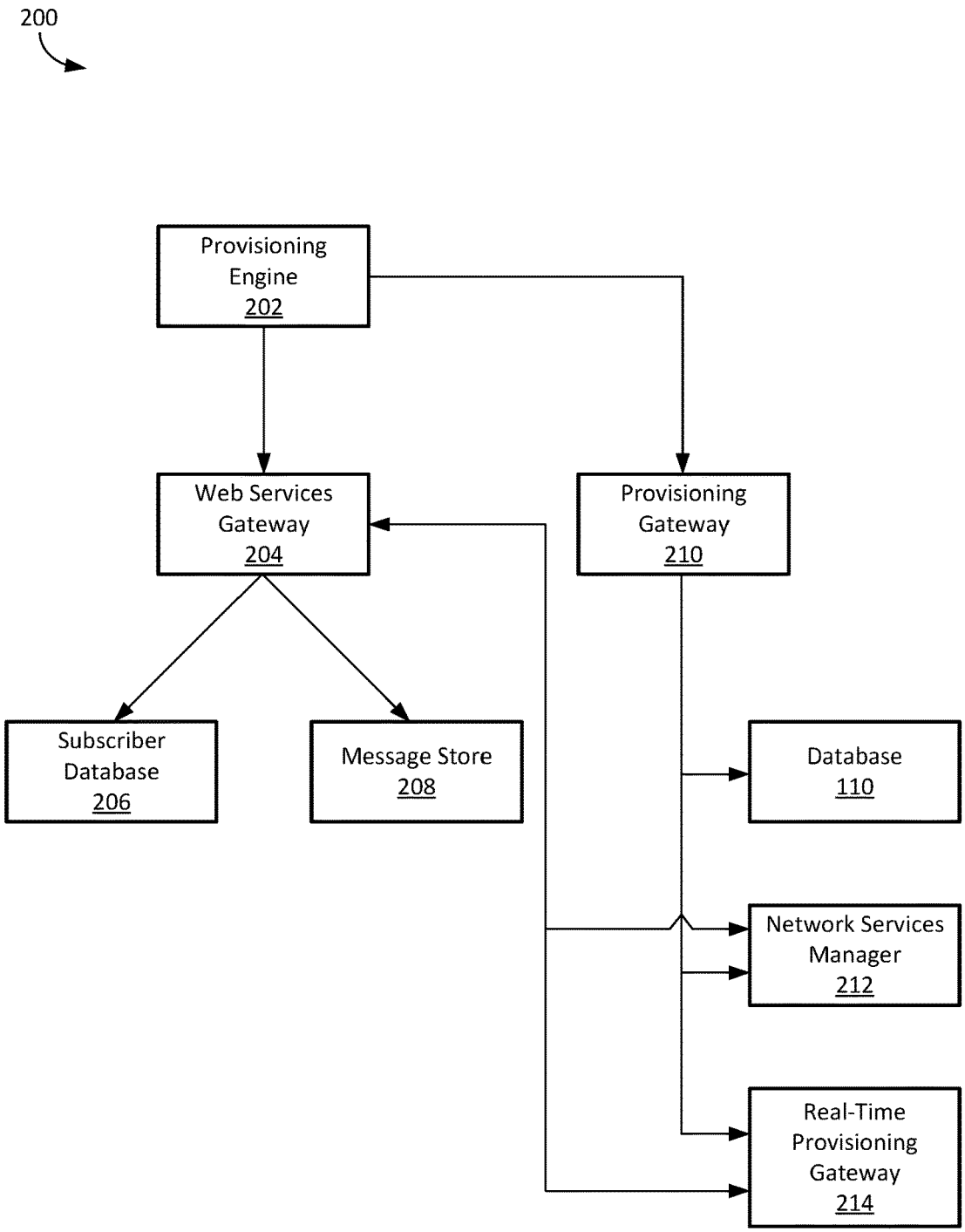
FIG. 2 illustrates a provisioning system that provisions messaging services via a web service gateway and generates a user profile information associated with the messaging services provisioned for a user profile.

FIG. 2 illustrates a network for provisioning services to user accounts via a provisioning engine and a consolidated provisioning workflow. In particular, FIG. 2 illustrates a provisioning network 200, that can be in communication with the network 100 via the database 110, that includes a provisioning engine 202, a web service gateway (WSG) 204, a subscriber database 206, and a message store 208. Additionally, the provisioning network can be in communication with a provisioning gateway (PGW) 210 that is in communication with the database 110, and a network service manager (NSM) 212.

In some examples, the provisioning engine 202 can be configured to manage and allocate network services for user profiles and services profiles that are associated with the provisioning network 200 and the communications network that includes the provisioning network 200. In particular, the provisioning engine can be configured to manage provisioning and deprovisioning of attributes and services associated with a user profile. More specifically, the provisioning engine 202 can be configured to allocate messaging services (e.g., SMS, MMS, RCS, voicemail, etc.), provision the messaging services, and provision features of the messaging services for the user profile while a user device associated with the user profile accesses the communication network associated with the provisioning network 200. Additionally, the provisioning engine 202 can be configured to transmit provisioning requests for the user profile to the WSG 204. It should be noted that previous provisioning engines transmitted provisioning requests for various messaging services independently to various network nodes. In contrast, the provisioning engine is configured to transmit a consolidated provisioning requests that includes one or more indications associated with the messaging services that indicate whether the user profile is to be provisioned with the messaging services. Accordingly, the consolidated provisioning request can transmit information to the WSG 204 that is configured to trigger the provisioning of the messaging services by the associated network nodes.

In some examples, the WSG 204 can be configured to receive the consolidated provisioning request from the provisioning engine 202 and modify user profile attributes in response to the consolidated provisioning request. In particular, the WSG 204 can determine, based at least on the provisioning request, a user profile that is to be provisioned a set of messaging services and a set of messaging features associated with the set of messaging services. As noted above, the messaging services can include SMS, MMS, RCS, voicemail, digital messaging services, and other services associated with the communications network. Additionally, the messaging service features can include features such as allocated storage space for user message history, quality of communication sessions, allocated bandwidth, access to enterprise and/or consumer specific services, and other features related to the functionality of the messaging services. Accordingly, the consolidated provisioning request can cause the WSG 204 to identify the set of messaging services that are to be provisioned for the user profile, allocate the set of messaging services to the user profile, and update the user profile to indicate that the user profile has access to the set of messaging services. Further, the WSG 204 can be configured to modify the user profile attributes of the user profile to indicate the set of messaging service features that have been provisioned for the user profile.

In some examples, the subscriber database 206 is configured to store one or more user profiles, including the user profile, that have been provisioned messaging services by the provisioning engine 202 and the WSG 204. In particular, the subscriber database 206 can be configured to store the user profile, a subscription associated with the user profile, and user profile information that is generated by and/or identified by the WSG 204 during provisioning for the user profile. Additionally, the set of messaging services and the set of messaging service features that have been provisioned by the WSG 204 can be stored by the subscriber database 206. Further, the subscriber database 206 can be configured to store the user profile attributes associated with the set of messaging services and the set of messaging service features provisioned for the user profile and provide the user profile attributes to the network nodes associated with the messaging services and the messaging service features when a user device (e.g., the user device 102 and the user device 106) attempts to access the messaging services and the messaging service features. Accordingly, the subscriber database 206 can be configured to store network-related user profile attributes that describe the messaging services and the messaging service features that have been provisioned for the user profile by the WSG 204.

In some examples, the message store 208 can be configured to store information received from the user device associated with the user profile and the user profile attributes related to the information received from the user device. In particular, the message store 208 can be configured to include the user profile attributes that are associated with voicemail storage and utilization. The user profile attributes can include the availability of visual voicemails, voicemail storage, Speech-To-Text and translation features, and other features related to the storage of voicemails. Additionally, the message store 208 can be configured to store voicemails and other messages associated with the user profile that are received by either the consumer voicemail system (e.g., the first voicemail datacenter 132, the third voicemail datacenter 136, etc.), the enterprise voicemail system (e.g., the second voicemail datacenter 134, the fourth voicemail datacenter 138, etc.), and/or other voicemail systems associated with the provisioning network 200. Accordingly, the WSG 204 can cause the message store 208 to allocate and configure a voicemail storage for the user device based at least on the consolidated provisioning request received by the WSG 204.

In some examples, the WSG 204 can receive a first indication from the subscriber database 206 and a second indication from the message store 208 that the provisioning has been completed for the user profile. In particular, the WSG 204 can receive the first indication from the subscriber database 206 indicating the provisioning requested by the consolidated provisioning request has been implemented for the user profile across the relevant messaging services (e.g., the messaging servers provisioned for the user profile by the consolidated provisioning request). Similarly. The WSG 204 can receive the second indication from the message store 208 indicating that message storage and the voicemail storage associated with the relevant messaging services has been provisioned for the user profile. Accordingly, the WSG 204 can determine that the provisioning of the relevant message services has been completed by the subscriber database 206 and the message store 208.

In some examples, the WSG 204 can function as a proxy for the messaging services that are provisioned by the provisioning engine 202. In particular, the WSG 204 can be configured as a consolidated gateway for service provisioning that is implemented by the provisioning engine 202, wherein the consolidated provisioning request directs service provisioning through the WSG 204 independent of the endpoint for the service provisioning. In contrast to previous systems, the WSG 204 can handle the distribution of provisioning operations to the subscriber database 206 and the message store 208 based on the consolidated provisioning request. Additionally, the WSG 204 can receive responses to the consolidated provisioning request from the subscriber database 206 and the message store 208 and return a consolidated provisioning response to the provisioning engine 202 that indicates completion of provisioning requested by the consolidated provisioning request. Accordingly, the WSG 204 can isolate the consolidated provisioning request and provisioning determinations generated by the provisioning engine 202 from backend databases and operations of the provisioning network 200. Further, the subscriber database 206, the message store 208, and other backend functions associated with provisioning can be decoupled from the provisioning engine such that provisioning requests are received, analyzed, and routed according to internal service provisioning profiles defined within the WSG 204. By configuring the WSG 204 as a proxy for the provisioning of messaging services that routes the consolidated provisioning request to the appropriate backend system (e.g., the subscriber database 206, the message store 208, etc.), the provisioning engine 202 can be configured to generate the consolidated provisioning request independent of the backend systems and the WSG 204 can be configured to direct the consolidated provisioning request to the appropriate backend systems based on internal profiles for the provisioning of the various messaging services.

In some examples, the provisioning engine 202 can cause a voicemail routing profile to be generated for the voicemail services profile associated with the services profile before, in parallel, or in sequence with the consolidated provisioning request. In particular, the provisioning engine 202 can transmit an indication of the messaging services that have been provisioned or will be provisioned for the user profile to the PGW 210. Additionally, the PGW 210 can receive the indication and determine the voicemail routing profile for the voicemail services profile and the services profile. It should be noted that the voicemail routing profile can include a voicemail pilot number, a VMR object, and/or voicemail platform ID. As noted above, the voicemail pilot number can be indicative of the category of user associated with the user profile and the services profile, wherein a first voicemail pilot number can be provided for users in the consumer category and a second voicemail pilot number can be provided for users in the enterprise category. Further, the pilot number can associate the user profile and the services profile with the enterprise voicemail system, the customer voicemail system, and/or other voicemail system associated with the communication network.

In some examples, the PGW 210 can be configured to receive the voicemail routing profile for the services profile from the provisioning engine 202 and distribute the voicemail routing profile to the database 110. The customer care tool like network services manager 212, and the real-time provisioning gateway used for iPhone VVM activation can fetch the voicemail routing profile from database 110 when needed. Alternatively, or in addition, the PGW 210 can be configured to generate the voicemail routing profile based at least on the indication of messaging services provisioned by the provisioning engine. In particular, the PGW 210 can receive the indication and determine the category of user associated with the user profile and/or the services profile that is identified by the indication, one or more messaging services that utilize voicemail routing profiles, and configurations for the one or more messaging services within the database 110, the network services manager 212, and/or the real-time provisioning gateway 214. Additionally, the PGW 210 can determine, based at least in part on the indication, the pilot number to be utilized for the voicemail routing profile and generate the VMR object to be included in the voicemail routing profile. Accordingly, the PGW 210 can be configured to receive the indication of provisioned messaging services and distribute the voicemail routing profile to enable the routing of voicemails from the IMS network 104 and the CS network 108 to the voicemail datacenters 132, 134, 136, and 138. Further the voicemail routing profile can be configured such that the BGCF 112 and the repository function 114 are able to receive the voicemail routing profile and route the communication session to the appropriate endpoint for depositing a voicemail. In at least one example, the provisioning engine 202 can receive the consolidated provisioning response from the WSG 204, determine that the messaging services have been provisioned and then generate the indication, based at least on the messaging services being provisioned by the WSG 204. In at least one additional example, the indication generated by the provisioning engine 202 can include the voicemail pilot number for the services profile, wherein the voicemail pilot number is determined based on an internal routing table that associates categories of users with pilot numbers and the indication is transmitted based at least on the provisioning engine identifying the pilot number for the voicemail services profile associated with the services profile.

In some further examples, the PGW 210 can be configured to generate and/or populate the voicemail routing profile based at least on internal lookup tables. In particular, the PGW 210 can include an internal lookup table that lists endpoints associated with various messaging services based at least on user information stored by the user profile and/or associated with the services profile. More specifically, the internal look up table can associate voicemail systems and pilot numbers that enable the BGCF 112 to route an unanswered call to the appropriate voicemail system for depositing the voicemail. Additionally, the internal look up table can enable the PGW 210 to receive at least an indication of the messaging services provisioned for the services profile and determine a pilot number for the voicemail services profile of the services profile. Further, the PGW 210 can utilize the pilot number to generate the voicemail routing profile that is provided to the database 110 in association with the voicemail services profile associated with the services profile.

In some examples, the voicemail routing profile can be transmitted to the database 110 for utilization by the IMS network 104 and the CS network 108. In particular, the PGW 210 can be configured to generate the voicemail routing profile, update the HLR-HSS services profile to include the voicemail routing profile, and transmit both HLR-HSS services profile and voicemail routing profile together to the database 110. Additionally, the PGW 210 can be configured to generate the services profile that includes user information and the messaging services that are available to the user device associated with the services profile. Alternatively, or in addition, the PGW 210 can be configured to modify the services profile based at least on the indication being associated with an existing services profile. More specifically, the PGW 210 can be configured to receive the indication from the provisioning engine 202 and determine whether the indication is associated with the existing services profile. Accordingly, the PGW 210 can generate and/or update the HLR-HSS services profile to include the voicemail routing profile and other information determined based at least on the indication received from the provisioning engine 202.

In some examples, the network services manager 212 can be configured to execute queries related to the messaging services profile and the voicemail routing service profile associated with the voicemail services profile. In particular, the database 110 can be configured to store the voicemail routing profile associated with the voicemail services profile and provide the voicemail routing profile to network nodes of the IMS network 104. Additionally, the network services manager 212 can be configured to query the WSG 204 to determine whether the voicemail service profile of the messaging services profile has been updated. For example, during provisioning of the user profile, the voicemail service profile can be generated by the WSG 204, deployed by the WSG 204 via the subscriber database 206 and the message store 208, and associated with the voicemail routing service profile within the database 110 by the PGW 210. Further, subsequent modifications to voicemail service provisioning may modify voicemail routing procedures, services available during voicemail routing, and other aspects of voicemail collection and storage. Accordingly, when the voicemail routing profile is requested from the database 110, the network services manager 212 can be configured to transmit a query to the WSG 204 to determine whether the voicemail service profile associated with the messaging services profile is to be updated.

In some additional examples, the network services manager 212 can be configured to update the voicemail service profile associated with the messaging services profile and the voicemail routing profile of the voicemail routing services profile. In particular, and as noted above, the network services manager 212 can be configured to query the WSG 204 to determine whether the voicemail service profile associated with the messaging services profile has been updated and determine whether an updated voicemail routing profile is to be generated for the voicemail services profile associated with the services profile. Additionally, the network services manager 212 can be configured to query the WSG 204, independent of a request for the voicemail routing services profile associated with the services profile, to determine whether the voicemail routing profile of the voicemail services profile is to be updated. More specifically, the WSG 204 can be configured to transmit an indication to the network services manager 212 when provisioning the voicemail services. Alternatively, or in addition, the network services manager 212 can be configured to determine whether the WSG 204 has implemented the update of voicemail services provisioning on a substantially periodic, aperiodic, continuous, and/or otherwise scheduled basis. Accordingly, the network services manager 212 can be configured to identify the updated information and update the voicemail routing services profile associated with the services profile.

In some further, examples, the network services manger 212 can be configured to update the voicemail service profile associated with the messaging services user profile and the voicemail routing profile associated with the voicemail services profile based at least on an update to the PGW 210. In particular, and as noted above, the PGW 210 can be configured to generate the voicemail routing services profile associated with the voicemail services profile in response to the provisioning request issued by the provisioning engine 202. Additionally, the PGW 210 can be configured to receive and/or generate the voicemail routing profile based at least on the indication of the messaging services that are to be provided for the user device. For example, the PGW 210 can include internal lookup tables, as noted above, that enable the PGW 210 to generate the voicemail routing profile based at least on the voicemail services profile associated with the services profile. Further, the network services manager 212 can be configured to determine that the internal lookup tables and/or other internal data associated with the PGW 210 (e.g., available services, available features associated with the messaging services, etc.) has been updated since the voicemail routing profile was generated and/or updated. The network services manager 212 can determine whether the internal lookup tables and/or other internal data of the PGW 210 was updated based at least on a query that is configured to determine whether an update has occurred or an indication, received from the PGW 210, that the update has occurred. Accordingly, the network services manager 212 can determine that the PGW 210 has received the update, modifying the internal lookup tables that describe configurations for voicemail routing profiles, and update the voicemail routing profile of the user device with the voicemail routing information associated with the PGW 210. It should be noted that the voicemail routing profile associated with the voicemail service profile of the messaging user profile can be updated by the network services manager 212 and/or the network services manager 212 can request an updated voicemail routing profile for the voicemail service profile from the PGW 210.

Figure 3:
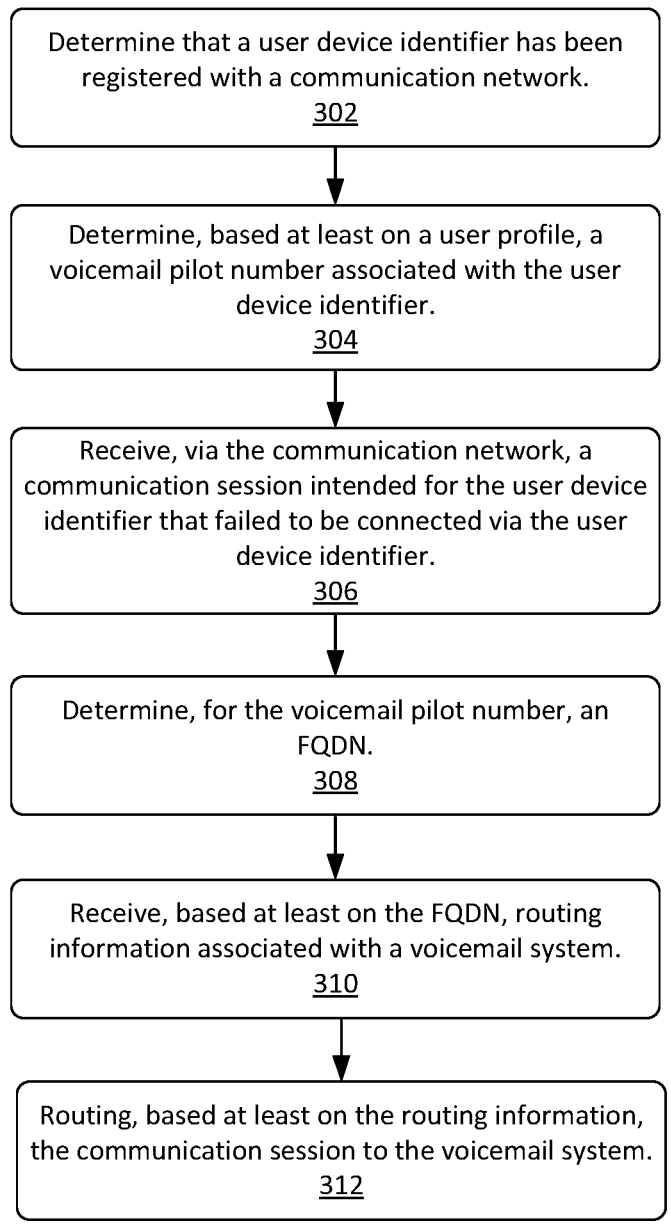
FIG. 3 illustrates a flowchart of a method for routing an unanswered communication session from a communication network to a voicemail system associated with the communication network.

FIG. 3 illustrates a flowchart of a method for routing an unanswered communication session from a communication network to a voicemail system associated with the communication network. In particular, the method can be configured to enable network nodes, such as the breakout gateway control function (BGCF) 112, to route an unanswered communication session to a voicemail system.

At block 302, a user device can be registered with a communication network such that incoming communications sessions and outgoing communication sessions are transmitted to and from the communication network. Additionally, the communication network can be configured to receive a device registration request (e.g., an IMS device registration request) from the user device and register the user device with the communication network. Further, the communication network can determine a services profile associated with a user device identifier (e.g., a MSISDN) that describes one or more messaging services that have been provisioned for the user profile. Accordingly, the communication network can receive the device registration request, register the user device with the communication session, and transmit a device registration response to the user device indicating that the user device has been registered. By registering the user device with the communication network, a user profile of the user device can access the one or more messaging services and one or more features associated with the one or more messaging services, that have been provisioned for the user profile by the WSG 204, via the communication network.

At block 304, the communication network can be configured to determine a voicemail routing profile and/or a services profile associated with the user device identifier. In particular, the communication network can be configured to determine, for the user device identifier, the voicemail routing profile information for directing unanswered communication sessions to the voicemail system that was provisioned for the voicemail sub-profile of the messaging user profile. For example, the voicemail routing profile of the services profile can include a voicemail routing number and/or a pilot number. The voicemail routing number and/or a pilot number can be utilized by a network node, such as the BGCF 112, to determine the voicemail system that will receive voicemails deposited in association with the services profile. During provisioning of the voicemail routing profile, a provisioning gateway (e.g., the PGW 210) can be configured to generate and/or receive the voicemail routing profile that includes the voicemail routing number and/or voicemail routing information determined based at least on user information associated with the user profile and the services profile. Additionally, the voicemail routing number and/or the voicemail routing information can be determined based at least on a type of user associated with the user profile and the services profile, the one or more messaging services that are accessed via the messaging service profile, and/or other user information that indicates the services profile is associated with a voicemail system for depositing voicemails. Accordingly, the communication network can be configured to determine the voicemail routing profile and utilize the voicemail routing information from the voicemail routing services profile to handle unanswered communication sessions for the user profile associated with the user device targeted by the unanswered communication session.

At block 306, the network node of the communication network can be configured to receive a communication session intended for the user device identifier that was unanswered by the user device and/or failed to be connected with the user device. In particular, the network node can receive the communication session from the communication network based at least on the communication network failing to establish the communication session between a sender user device identifier and a receiver user device identifier. Additionally, the communication network can receive, from the user device identifier, a communication session invite that indicates the receiver user device identifier as a target for the communication session and information for establishing the communication session. Further, the communication network can receive, based at least on the receiver user device not accepting the communication session invite, an indication that a voicemail is to be deposited by the communication session. Accordingly, the communication session can be forwarded by the communication network to the network node based at least on the receiver user device not accepting the communication session invite issued by the sender user device.

At block 308, the network node can determine, for the voicemail pilot number stored by the user's voicemail routing profile, a Fully Qualified Domain Name (FQDN) for the voicemail system that will receive the voicemail generated in association with the communication session. More generally, the FQDN can be a voicemail system identifier that can be provided to a server and/or a database to identify routing information that enables the network node to transfer the communication session to the voicemail system. As noted above, the FQDN (or other voicemail system identifier) can be provided to a repository function (e.g., repository function 114 consisting of DNS and GTM) that is configured to identify the voicemail system that the communication session will be routed to. In particular, the network node can include an internal lookup table that associates voicemail pilot numbers with FQDNs. Additionally, the voicemail pilot numbers can be individually assigned to FQDNs based at least on information associated with geographical location of voicemail systems, type of user, and/or other user profile/services profile information. Accordingly, the voicemail pilot numbers assigned to services profiles via the voicemail routing profiles are associated with the FQDN(s) that are defined for the network node and enable communication session handling to be executed that directs unanswered communication sessions to the appropriate voicemail systems.

At block 310, the network node can receive, based at least on the FQDN, routing information associated with a voicemail system. In particular, the network node can transmit the FQDN to a repository function (e.g., DNS and GTM) that is associated with the communication network. The repository function can be configured to receive the FQDN and utilize the FQDN to identify routing information for the voicemail systems associated with the communication network. More specifically, the FQDN and the one or more FQDNs that are stored via the internal lookup tables of the network node can be associated with service IPs, virtual IPs, network ports, network gateways, and other routing information that the unanswered communication session can be routed through to reach the voicemail system that will receive the voicemail for the user profile. Additionally, the repository function can include additional lookup tables and/or be associated with a database that stores the routing information for directing the unanswered communication session to the voicemail system. The repository function can be configured to obtain routing information for a load balancer associated with the voicemail system. Accordingly, the network node can receive, in response to a query that includes the FQDN and requests routing information for the voicemail system, a query response from the repository function indicating and enabling the unanswered communication session to be routed to the voicemail system via load balancer.

In some examples, the repository function can be associated with a Global Traffic Manager (GTM) that is configured to map the FQDN and the one or more additional FQDNs to a plurality of load balancers. In particular, the FQDN can be mapped to a set of load balancers that handle unanswered communications sessions that are received from the communication network and determine a voicemail datacenter that a voicemail can be deposited with. The GTM can store geographical location information for the load balancers situated in various voicemail datacenters such that the unanswered communication session is routed to a load balancer in a specific voicemail datacenter based at least on the geographical proximity and/or the access network that is associated with the user device that initiated the unanswered communication session. Additionally, the GTM can store FQDNs defined based on messaging service information for the load balancers (e.g. enterprise or consumer services) and the voicemail datacenters such that the unanswered communication session is routed to an additional load balancer and deposited with an additional voicemail datacenter based at least on the additional load balancer and/or the additional voicemail datacenter having the capacity to receive the unanswered communication session and provide the appropriate messaging service and messaging service features. Further, the GTM can store FQDNs defined based on utilization information for the load balancers (e.g., ratio or round robin load balancing methods) such that the unanswered communication session is routed to a further load balancer and deposited with a further voicemail datacenter that is capable of receiving the unanswered communication session. Accordingly, the GTM can receive the FQDN for the unanswered communication session from the repository function, determine the load balancer that the unanswered communication session will be routed to for depositing the voicemail, and return the routing information for the load balancer to the repository function.

At block 312, the network node can direct, based at least on the routing information received from the repository function, the unanswered communication session to the voicemail system. In particular, the network node can receive the routing information for the voicemail system from the repository function and route the unanswered communication session to the load balancer indicated by the routing information. Additionally, the routing information can be utilized to update an invite for the unanswered communication and/or route the invite for the unanswered communication session to the load balancer identified to the network node by the repository function. Accordingly, the network node can route the unanswered communication session to the load balancer identified by the repository function and cause the unanswered communication session to deposit a voicemail with a voicemail datacenter.

Figure 4:
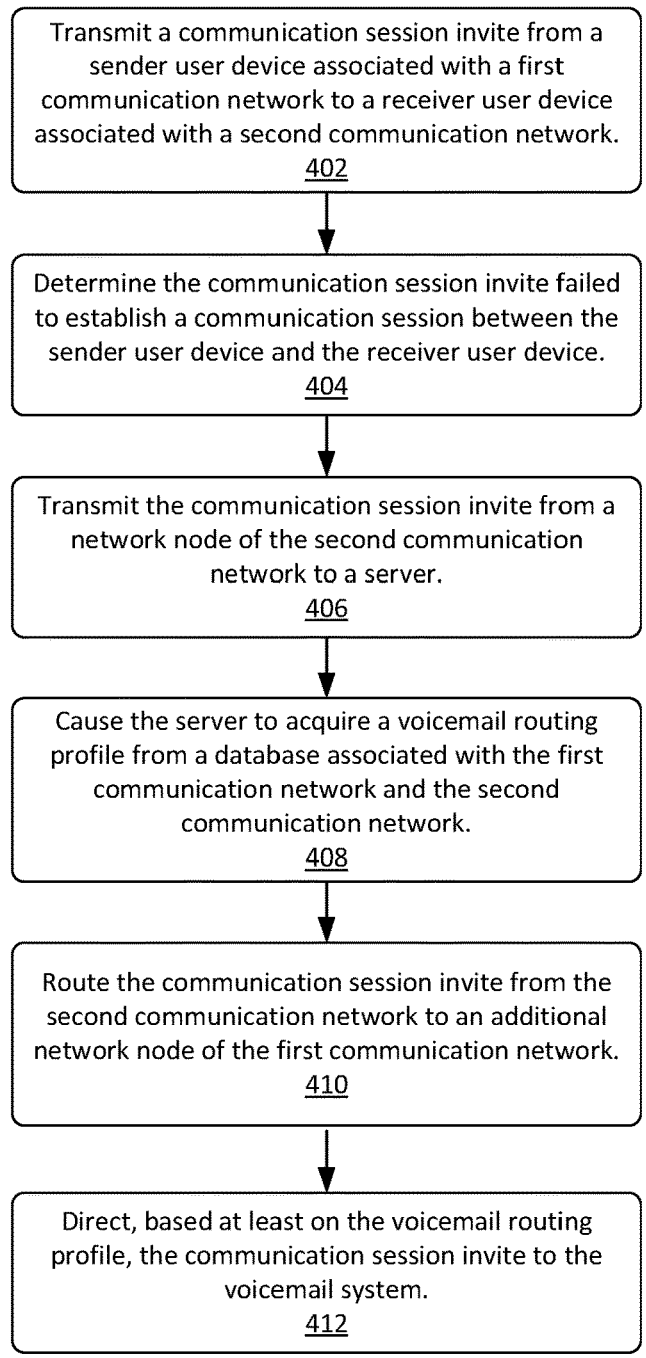
FIG. 4 illustrates a flowchart of a method for routing an unanswered communication session from a communication network to a voicemail system associated with an additional communication network via an intermediate server.

FIG. 4 illustrates a flowchart of a method for routing an unanswered communication session from a communication network to a voicemail system associated with an additional communication network. In particular, the method can be configured to enable network nodes, such as a media gateway control function (MGCF), to route the unanswered communication session to the additional communication network such that the unanswered communication session can deposit a voicemail with the voicemail system. It should be noted that the communication network can be a circuit switched network (e.g., the CS network 108) that is capable of routing communication sessions to the additional communication network via a bridge function (e.g., the MRFC 140), wherein the additional communication network is a packet switched network (e.g., the IMS network 104).

At block 402, a communication session invite can be transmitted from a sender user device associated with a first communication network (e.g., IMS network) to a receiver user device associated with a second communication network (e.g., CS network). In particular, a control function of the first network can receive the communication session invite (e.g., a SIP invite) from the sender user device and identify the receiver user device based at least on the communication session invite. For example, the communication session invite can include a recipient identifier that indicates the communication session invite is intended for the receiver user device and additional information for routing the communication session invite to the receiver user device to establish the communication session. It should be noted that while the following discussion refers to a communication session that is intended to be established via the second communication network and the first communication network, similar concepts can be utilized to deposit a voicemail from a communication session that is internal to the second communication network via the first communication network. Additionally, the voicemail may be deposited via the first communication network due to the second communication network utilizing legacy systems (e.g., systems that have been discontinued in favor of systems implemented via the first communication system), services of the second communication network being incorporated into the first communication network, and/or other integrations of the second communication network into the first communication network. Accordingly, the communication session invite can be generated by the sender device and transmitted to the receiver device via the first communication network and the second communication session.

At block 404, the communication session invite may fail to establish a communication session between the sender user device and the receiver user device. In particular, the communication session invite may be sent from the sender user device, via the first communication network (e.g., IMS network), to the receiver user device, via the second communication network (e.g., CS network), and the receiver user device may deny, reject, fail to response, and/or otherwise ignore the communication session invite. Additionally, failure to establish the communication session may be reported to the first communication network by the second communication network. Further, the failure to establish the communication session may result in the communication session invite and the unanswered communication session to be transmitted to a network node of the second communication network (e.g., the MGCF), the network node configured to handle depositing a voicemail from the sender user device. Accordingly, the failure to establish the communication session between the sender user device and the receiver user device may initiate handling of the communication session for depositing a voicemail generated from the sender device.

At block 406, the network node (e.g., MGCF) can transmit the communication session invite to a server associated with the first communication network. In particular, the communication session invite can be transmitted to a bridge function that is in communication with the first communication network and the second communication network via the server. Additionally, the bridge function may be configured to connect the network node with the first communication network such that the network node can route the unanswered communication session to the first communication network. For example, the network node can be the MGCF and can be configured to handle voicemail depositing for user devices associated with the second communication network. The MGCF can receive the communication session invite and transmit the communication session invite to an MRFC (e.g., the MRFC 140) such that the communication session invite and the unanswered communication session can be transferred to a BGCF (e.g., the BGCF 112) for voicemail depositing. Accordingly, the network node can be configured as a gateway function that routes the unanswered communication session to the bridge function such that a voicemail routing profile can be identified for the receiver user device identifier and the unanswered communication session.

In at least one example, the communication session invite can originate from the first communication network and be routed through the second communication network to the network node. In particular, the first communication network can be configured to establish an inter-network communication session with the second communication network to transmit the communication session invite to the receiver user device. Additionally, the network node can receive the communication session invite and the inter-network communication session and cause the communication session and the inter-network communication session to be routed to the additional network node (e.g., the BGCF 112) of the first communication network such that a voicemail may be deposited by the sender user device. Accordingly, the network node may be configured to redirect the communication session invite received via the first communication session to the additional network node such that the sender user device may deposit the voicemail via the first communication network.

At block 408, the server can acquire a voicemail routing profile from a database associated with the first communication network and the second communication network based at least on the bridge function receiving the communication session invite. In particular, the bridge function can be configured to associate the communication session invite with a user profile and the voicemail routing profile of a services profile based at least on receiver information stored by the communication session invite. For example, the communication session invite can include an invite header that stores information regarding the sender user device identifier and the receiver user device identifier such that the communication session can be established between the sender user device and a voicemail box associated with the receiver user device. More specifically, the invite header can include an indication of the receiver user device identifier that may be utilized by the bridge function to identify the voicemail routing profile associated with the receiver user device. Accordingly, the bridge function can query the database to access a services profile and receive the voicemail routing profile associated with the voicemail routing services profile associated with the services profile.

In some examples, the sender user device can be registered to the second communication network via the database accessed by the bridge function via the server. More specifically, the database can be associated with the first communication network and the second communication network to store a plurality of services profiles that are registered to be the first communication network and/or the second communication network. Additionally, the database can identify, for a services profile, a user device that is registered in association with the services profile, and the voicemail routing profile provisioned for the services profile by a provisioning engine associated with the first communication network and/or the second communication network. Further, the database can be accessed by the bridge function such that the communication session invite and/or the unanswered communication session can be associated with the voicemail routing profile and provided to the additional network node of the first communication network.

At block 410, the server can route the communication session invite from the second communication network to an additional network node of the first communication network. In particular, the bridge function can cause the communication session invite and the unanswered communication session to be routed to the additional network node in association with the voicemail routing profile. Additionally, the voicemail routing profile can include at least a voicemail pilot number that may be utilized by the additional network node to identify routing information for the communication session invite. Accordingly, the additional network node (e.g., BGCF) can be configured to identify the routing information for routing the communication session invite and the unanswered communication session to a voicemail system.

In some examples, and similar to the discussion above associated with FIG. 3, the additional network node (e.g., BGCF) can determine, for the voicemail routing profile and/or the voicemail pilot number stored by the services profile, a Fully Qualified Domain Name (FQDN) for the voicemail system that will receive the voicemail generated in association with the communication session. More generally, the FQDN can be a voicemail system identifier that can be provided to a repository (e.g., DNS and GTM) to identify the routing information that enables the additional network node to transfer the communication session invite to the voicemail system. As noted above, the FQDN (or other voicemail system identifier) can be provided to the repository function (e.g., repository function 114) such that the repository function identifies the voicemail system that the communication session invite will be routed to. In particular, the additional network node can include an internal lookup table that associates voicemail routing profile information and/or voicemail pilot numbers with FQDNs. Additionally, the voicemail pilot numbers can be individually assigned to FQDNs based at least on information associated with geographical location of voicemail systems, type of user, and/or other user profile/services profile information. Accordingly, the voicemail pilot numbers assigned to services profiles via the voicemail routing profiles are associated with the FQDN(s) that are defined for the network node and enable communication session handling to be executed that directs unanswered communication sessions to the appropriate voicemail systems.

At block 412, the additional network node can direct, based at least on the voicemail routing profile, the communication session invite to the voicemail system. In particular, the communication session invite can be routed to a load balancer associated with the voicemail system such that the unanswered communication session may deposit a voicemail to a voicemail system identified by the load balancer. It should be noted that the voicemail system that the voicemail is deposited to can be identified by the load balancer at random, by sequential iteration or round-robin through a set of voicemail servers (e.g., the load balancer sequentially assigns unanswered communication sessions to the set of voicemail systems), based on utilization of the voicemail servers, the voicemail systems of the voicemail datacenters, and/or other distinguishing factors that enable the voicemail system to be selected and the communication session routed to the voicemail datacenter associated with the selected voicemail system. Accordingly, the communication session invite can be received by the load balancer from the additional network node and the unanswered communication session can be established with the voicemail server to deposit the voicemail.

Figure 5:
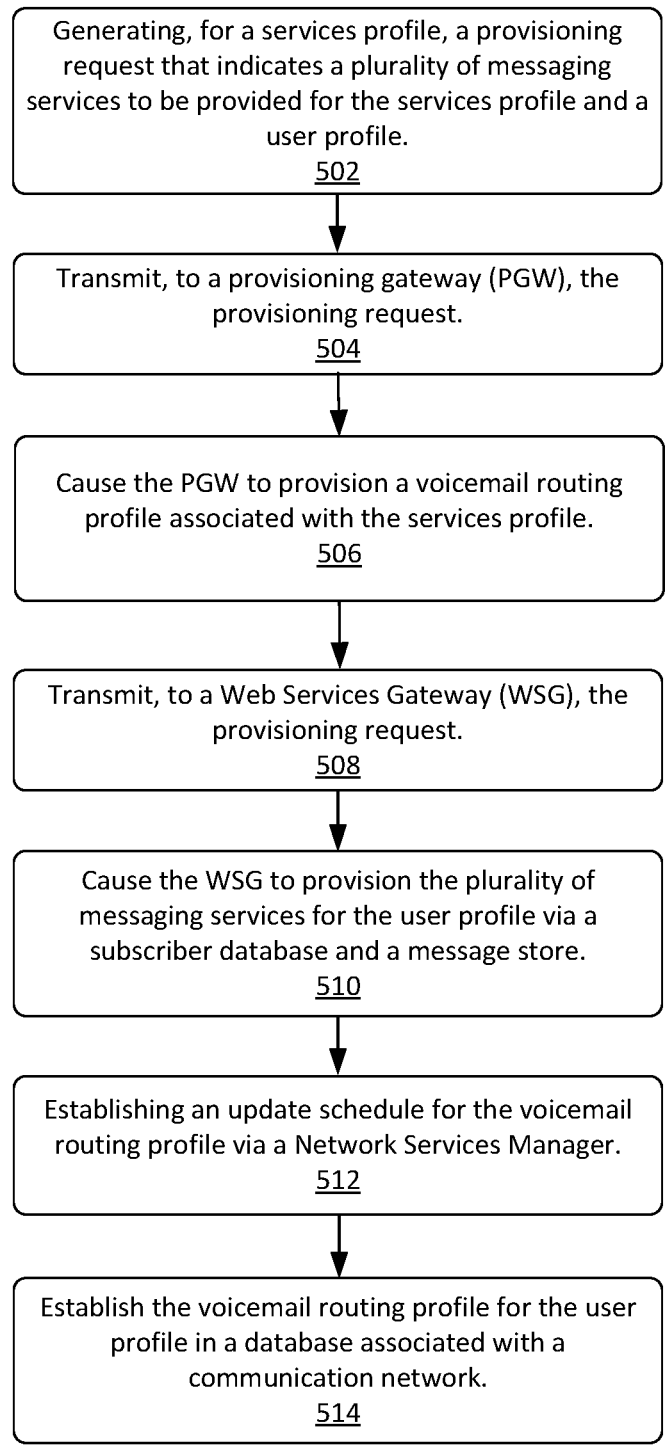
FIG. 5 illustrates a flowchart of a method for provisioning messaging services for a user profile and generating a voicemail routing profile for the messaging services.

FIG. 5 illustrates a flowchart of a method for provisioning messaging services for a user profile and generating a voicemail routing profile for the voicemail messaging service.

At block 502, a provision engine can generate, for a user profile, a provisioning request that indicates a plurality of messaging services to be provided for the user profile via the services profile. In particular, the provisioning engine can receive an indication that causes the services profile to be created and/or updated. The services profile may be utilized by the user device and/or the user profile to access the plurality of messaging services via a communication network. Additionally, the provisioning engine can receive an additional indication that the user profile has been granted one or more messaging service features associated with the plurality of messaging services. The additional indication may be configured to update the services profile such that communication sessions associated with the services profile are appropriately routed to endpoints capable of providing the one or more messaging service features (e.g., speech to text conversion of voicemail recordings to readable text). It should be noted that the plurality of messaging services can include short message service (SMS), multimedia message service (MMS), rich communication service (RCS), voicemail service, and other services provided by the communication network. Similarly, it should be noted that the one or more messaging services can include cloud and/or remote storage of messages, translation of messages, text-to-speech services, speech-to-text services, and other features that may be associated with the plurality of messaging services.

Accordingly, the provisioning engine can generate the provisioning request to cause the plurality of messaging services to be accessible to user devices registered to the user profile via the services information and the routing information stored by the services profile.

At block 504, the provisioning engine can transmit the provisioning request to a provisioning gateway (PGW). In particular, the provisioning engine can be associated with the PGW such that one or more provisioned messaging services can be configured for the services profile. More specifically, the provisioning request can indicate, for the one or more provisioned messaging services and/or the plurality of messaging services, that the PGW is to generate the services information for the services profile that enables the operation of the one or more provisioned messaging services. The information generated by the PGW can include access information, routing information, handling information, and feature information that is utilized by a communication network when the user device associated with the services profile accesses a provisioned messaging service. For example, the services profile can be granted access to a voicemail service such that unanswered communication session deposit voicemails via a voicemail datacenter. Additionally, the PGW can be configured to generate a voicemail routing profile and other information associated with depositing a voicemail (e.g., a type of customer i.e. consumer or enterprise, timestamp of when the profile was created etc.). Accordingly, the provisioning engine can generate and transmit the provisioning request to the PGW such that the PGW generates and stores information associated with the one or more provisioned messaging services for the user profile.

At block 506, the provisioning engine can cause the PGW to provision a voicemail routing profile associated with the voicemail messaging service for the voicemail routing services profile. In particular, the voicemail routing profile can be provisioned by the PGW based at least on the provisioning request transmitted by the provisioning engine, the voicemail routing profile including voicemail service information for the voicemail routing services profile that grants access to the voicemail service. Additionally, the voicemail routing profile can be generated by the PGW based at least on the one or more user attributes that the provisioning request includes. Alternatively, or in addition, the provisioning request can include the voicemail routing profile such that the voicemail routing profile can be associated with the services profile and the user profile created via the WSG by the provisioning request. Accordingly, the PGW can enable the user profile and user devices associated with the user profile to deposit voicemails via a voicemail system accessed via the voicemail routing services profile.

In some examples, the voicemail routing profile generated and/or provided to the PGW can be configured to identify the voicemail system that the user device associated with the user profile and the services profile will deposit voicemails with. In particular, voicemail profile information can be configured, along with the internal lookup tables of a network node and information utilized by a repository function to determine routing information, to identify the voicemail system that unanswered communication sessions will be directed to. The voicemail profile information, such as a voicemail pilot number, can be determined based at least on the one or more user attributes indicating that the user profile and the services profile are associated with a user class. The user class can indicate that the user profile and the services profile are associated with a consumer user, an enterprise user, a government user, a corporate entity, and/or other user classes that are provided individual voicemail systems. Accordingly, the voicemail routing profile can be configured such that the user device deposits voicemails with the voicemail system that is associated with at least the user class associated with the user profile and the services profile.

At block 508, the provisioning engine can transmit the provisioning request to a Web Services Gateway (WSG). As noted above, with reference to FIG. 2, the provisioning engine can be associated with the WSG such that the plurality of messaging services can be provisioned for the user profile. More specifically, the provisioning request can indicate, for the plurality of messaging services, whether the user profile is granted access to a messaging service and the messaging service features that are accessible via the user profile. Accordingly, the provisioning engine can generate and transmit the provisioning request to the WSG such that the WSG provisions and/or deprovisions each of the plurality of messaging services for the user profile.

At block 510, the provisioning engine can cause the WSG to provision the plurality of messaging services via a subscriber database and a message store. As noted above, the WSG can be associated with a subscriber database and a message store such that can be utilized to provision one or more messaging services from the plurality of messaging services based at least on the provisioning request. In particular, the WSG can be configured to store the user profile, a subscription associated with the user profile, and user profile information that is generated by and/or identified by the WSG via the subscriber database and message store for the user profile. Additionally, one or more indications of the one or more messaging services can be stored by the WSG via the subscriber database. Further, the WSG can generate and store user profile attributes that define the messaging service features available to the user profile via the subscriber database and message store based on the provisioning request. Accordingly, the WSG can configure the user profile, via the subscriber database and message store, to indicate the one or more provisioned messaging services and the user profile attributes such that a communication network can access the subscriber database and message store and implement the provisioned messaging services for user device(s) associated with the user profile.

In some examples, the WSG can configure the message store to store information received from the user device associated with the user profile and the user profile attributes related to the information received from the user device. In particular, the WSG can configure the message store such that deposited voicemails, messages, video files, audio files, and other information may be stored by the user device and/or the user profile. Accordingly, the WSG can provide the user profile attributes and indications of the provisioned messaging services to the message store that cause an amount of storage to be allocated for the user profile and/or the user device.

At block 512, an update schedule can be established for the voicemail routing profile via a network services manager (e.g., the network services manager 212. In particular, the network services manager can be configured to execute queries related to the user profile and the voicemail routing profile associated with the user profile to determine whether the voicemail routing profile and/or the user profile have been updated. Additionally, the PGW can be configured to set the update schedule that the network services manager utilizes to query the WSG or other service function. Further, the network services manager can be configured to determine whether the WSG has implemented the update of voicemail services provisioning on a substantially periodic, aperiodic, continuous, and/or otherwise scheduled basis that is defined by the update schedule. Accordingly, the PGW can be configured to generate and assign the update schedule to the network services manager in response to the provisioning request issued by the provisioning engine.

At block 514, the voicemail routing profile can be established in a database associated with a communication network for the user profile. More specifically, the voicemail routing profile can be provided, by the PGW, to the database that is accessed by the communication network during registration of a user device with the user profile and during routing of an unanswered communication session.

Figure 6:
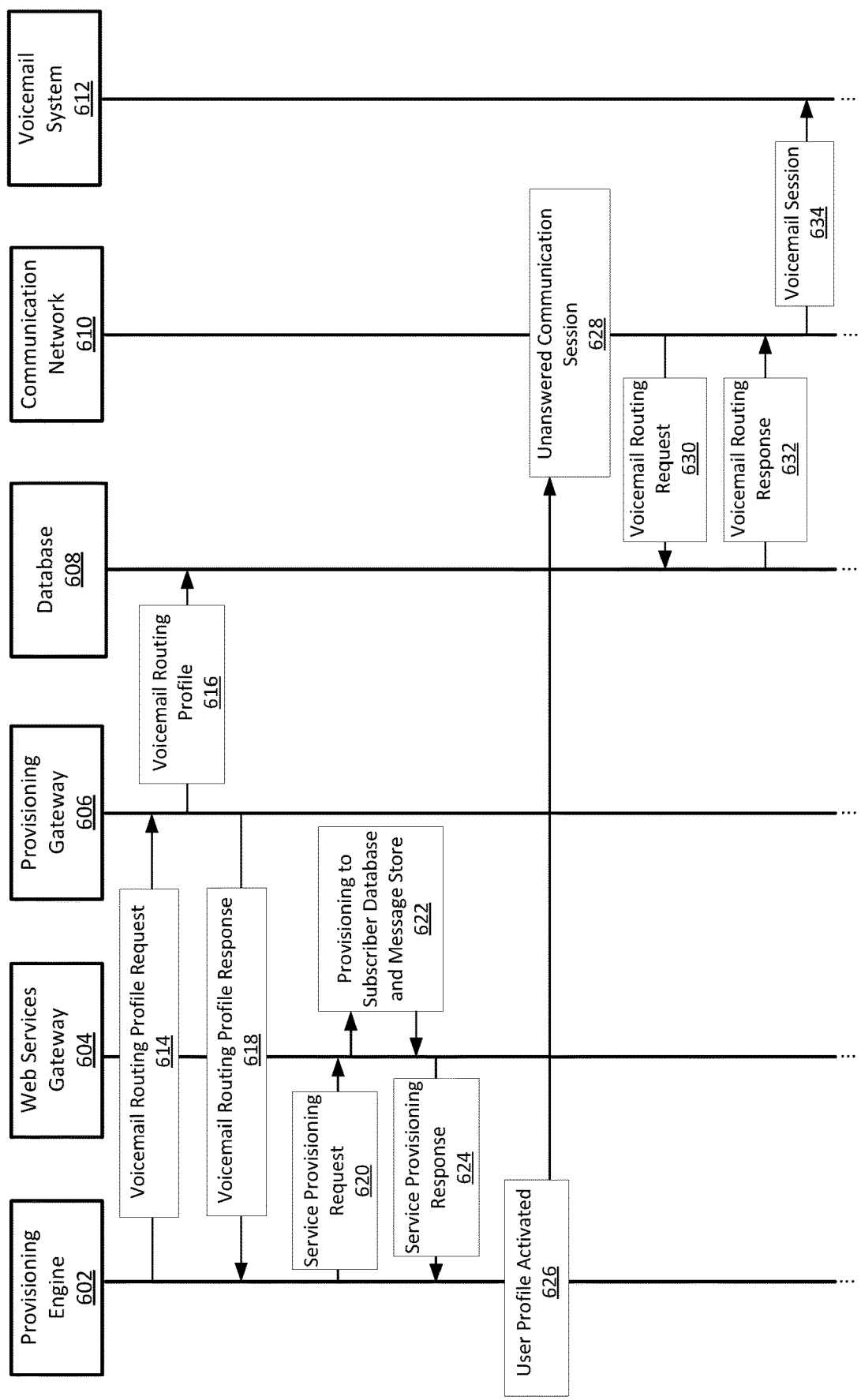
FIG. 6 illustrates a diagram for generating a voicemail routing profile of a user profile within a database such that the voicemail routing profile is utilized by a communication network to route an unanswered communication session.

FIG. 6 illustrates a timing diagram for generating a voicemail routing profile of a user profile within a database such that the voicemail routing profile is utilized by a communication network to route an unanswered communication session. In particular, FIG. 6 illustrates a process for a provisioning engine 602, a Web Services Gateway (WSG) 604, a provisioning gateway 606, a database 608, a communication network 610, and a voicemail system 612 to provision and provide voicemail service for a user profile that is associated with a user device.

At block 614, the provisioning engine 602 can generate a voicemail routing profile request and transmit the voicemail routing profile request to the provisioning gateway 606. In particular, the voicemail routing profile request can be configured to cause the provisioning gateway 606 to generate a voicemail routing profile for a voicemail service of the one or more messaging services that is provisioned for the services profile. Alternatively, or in addition, the voicemail routing profile request can be configured via the provisioning gateway 606 to establish update schedules via a network services manager. A voicemail routing profile can be read by real-time provisioning request interfaces from database 608 for the voicemail routing services profile. The real-time provisioning request interfaces may be configured via a real-time provisioning gateway (e.g., the real-time provisioning gateway 214) and enable messaging services (e.g., visual voicemail for iOS devices) that are added to the user profile in substantially real-time. Accordingly, the voicemail routing profile request can enable the voicemail routing profile to be generated and/or configured such that the voicemail service of the one or more messaging services can be utilized by unanswered communication sessions that are generated by the user device associated with the user profile via the services profile.

At block 616, the provisioning gateway 606 can be configured to submit the voicemail routing profile and/or the services profile to the database 608. In particular, the provisioning gateway can submit the voicemail routing profile to the database 608 for storage in association with the communication network 610 such that, when a user device associated with the user profile registers with the communication network 610, the communication network 610 can access the voicemail routing profile/the services profile and utilize the voicemail routing profile/the services profile to route unanswered communication sessions to a voicemail system 612 associated with the voicemail service provisioned by the provisioning engine 602.

At block 618, the provisioning gateway 606 can transmit a voicemail routing profile response that indicates the voicemail routing profile for the voicemail service has been submitted to the database 608. Accordingly, the voicemail routing profile response can indicate that the voicemail routing profile and the voicemail service may be utilized by the user device associated with the user profile via the communication network 610 associated with the database 608.

At block 620, the provisioning engine 602 can generate a service provisioning (SOAP) request that is transmitted to a web services gateway 604. In particular, the service provisioning request can be configured such to cause the web services gateway 604 associates the one or more messaging services with the user profile via a subscriber database and/or a message store. Additionally, the service provisioning request can include one or more user attributes that are provided to the subscriber database in association with the one or more service features to enable access to the one or more service features via the user profile. Further, the service provisioning request can cause the web services gateway 604 to allocate storage space for the user profile within the message store. Accordingly, the provision engine 602 can cause the web services gateway 604 to enable the user profile to access the one or more messaging services and/or the one or more service features via the communication network 610. It should be noted that when the one or more messaging services are accessed by the user device associated with the user profile, the services profile is utilized for handling the messaging services within the communication network and the user profile is utilized for identifying permissions and messaging service features that are to be provided for the user device.

At block 622, the web services gateway 604 can configure a subscriber database such that the one or more messaging services and the one or more services features are accessible via the user profile. Additionally, the web services gateway 604 can assign the user profile an amount of storage within a message store.

At block 624, the web services gateway 604 can transmit a service provisioning response that indicates the one or more messaging services have been provisioned for the user profile. Additionally, the service provisioning response can indicate that the one or more service features have been associated with the one or more messaging services accessed via the user profile.

At block 626, a provisioning engine 602 can determine that the user profile and the services profile have been provisioned. In particular, the provisioning engine 602 can determine that the user profile has been generated and/or associated with an active subscription to one or more communication networks, including the communication network 610. Similarly, the provisioning engine 602 can determine that the services profile has been generated such that the active subscription and communication sessions associated with the active subscription are received and transmitted to associated endpoints (e.g., messaging service servers, communication session endpoints, etc.) Additionally, the provisioning engine 602 can determine that the user profile has been associated with one or more messaging services and one or more service features based at least on the active subscription associated with the user profile. Further, the provisioning engine 602 can provide one or more user attributes that are either stored by the user profile and/or submitted to the provisioning engine 602 to update the user profile. The one or more user attributes can be configured to enable access to the one or more messaging services via the user profile (e.g., username and password), indications of a user class (e.g., consumer, enterprise, etc.), and/or additional user information that modifies functionality of the one or more messaging services and/or the one or more service features.

At block 628, the communication network 610 can determine that a communication session invite was not responded to by a target device and determine that an unanswered communication session is associated with the user device and the user profile.

At block 630, the communication network 610 can transmit a voicemail routing (diameter) request to the database 608. The voicemail routing request can be configured to identify the user device, the user profile associated with the user device, and/or that the unanswered communication session is to be routed to the voicemail system 612. Additionally, the voicemail routing (diameter) request can be transmitted to the database 608 based at least on the user profile being registered with the communication network 610 when the user device connects to the communication network 610. Accordingly, the communication network 610 can cause the database 608 to generate, at block 632, the voicemail routing response that include the voicemail routing profile of the user profile.

At block 634, the communication network 610 can establish a voicemail deposit session with the voicemail system 612 that receives the unanswered communication session and enables the user device to deposit a voicemail. In particular, the voicemail deposit session may be established per the methods of FIGS. 1, 2, 3, and 4 such that the voicemail routing profile is provided to a network node of the communication network 610, a voicemail system identifier is obtained based on the voicemail routing profile, and a repository function associated with the communication network 610 determines routing information for the voicemail system 612 based at least on the voicemail system identifier. Accordingly, the voicemail session can be established and a load balancer of the voicemail system 612 at a specific voicemail datacenter can determine a voicemail server that receive the voicemail and stores the voicemail based at least on the amount of storage allocated via the message store.

Figure 7:
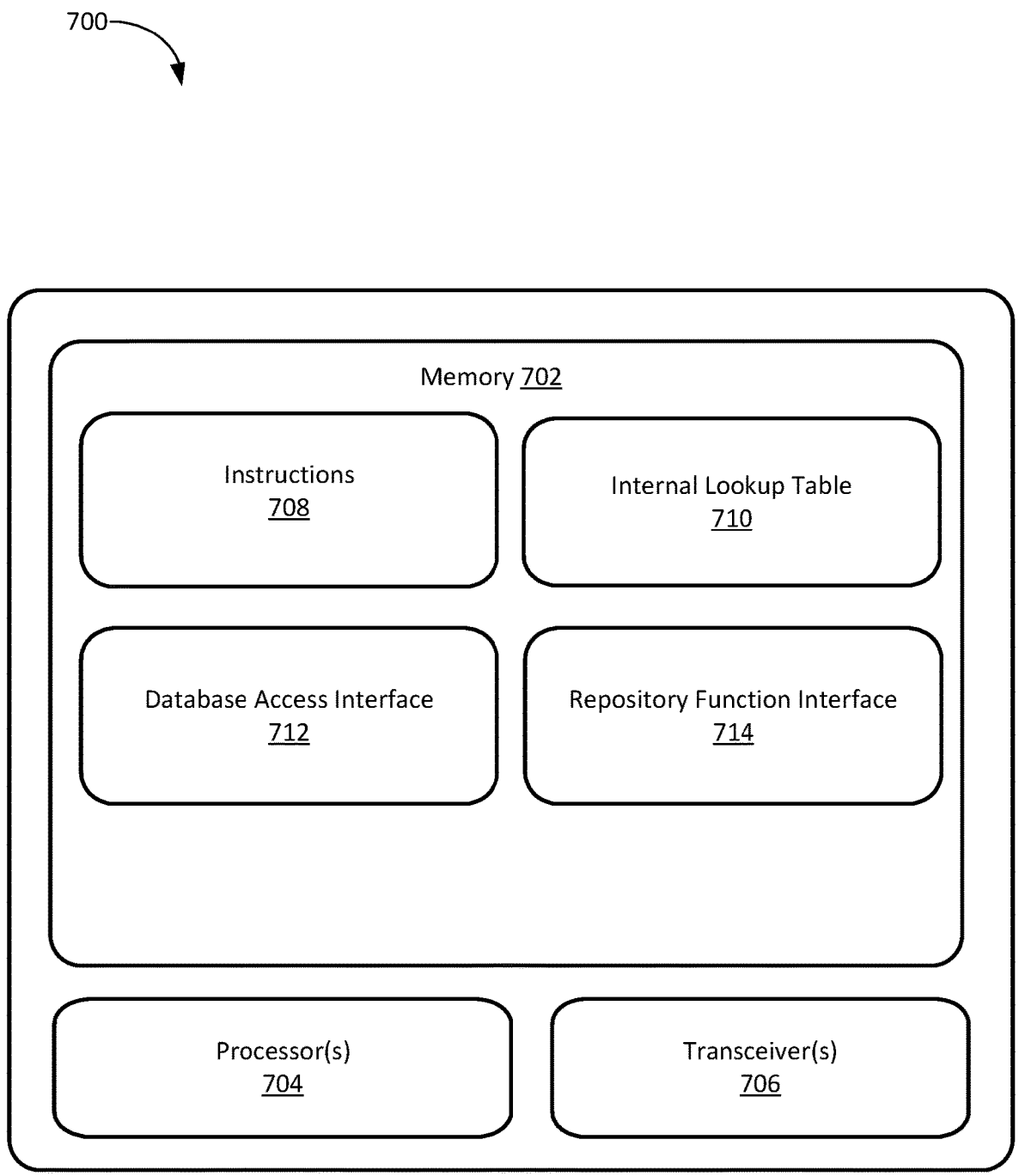
FIG. 7 is a block diagram of a control node capable of implementing the methods disclosed herein.

FIG. 7 is a block diagram of a control node capable of implementing the methods disclosed herein, in accordance with some examples of the present disclosure. In some examples, a network node 700 can correspond to any of the network nodes discussed in FIGS. 1, 2, 3, 4, 5, and 6. As illustrated, the network node 700 is generally comprised of memory 702, one or more processors 704, and one or more transceivers 706.

In some examples, memory 702 is volatile (such as RAM), non-volatile (such as ROM, flash memory, etc.) or some combination of the two. Memory 702 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that can be accessed by the network node 700. Memory 702 can comprise of one or more instructions 708 that are executed by processors 704 and cause processors 704 to perform operations of the methods discussed above. Further, memory 702 can comprise additional modules that can be executed by processors 704 and/or be utilized in association with the processors 704 to cause processors 704 to perform additional operations associated with network node 700. The additional modules can comprise network forwarding modules, network monitoring modules, and other network modules.

In some examples, processors 704 can include one or more central processing units (CPUs), one or more graphics processing units (GPUs), both CPUs and GPUs, or other processing units or components known in the art.

In some examples, transceivers 706 can include one or more wired or wireless transceivers. For example, transceivers 706 can include a network interface card, a network adapter, a LAN adapter, an address associated with a network connection, or another device permitting communications to be sent and received. Additionally, transceivers 706 can comprise any wireless transceiver capable of engaging in wireless, radio frequency (RF) communication. Further, transceivers 706 can include additional wireless modems, such as Wi-Fi, WiMax, Bluetooth, and/or infrared communication modems.

In some additional examples, transceivers 706 can be configured to transmit communications via Internet-based communication networks, 3G networks, 4G networks, 5G network, and other communication networks. Internet-based communication networks can include networks that utilize the Internet of Things, provided by Internet Service Providers, that interconnect various user devices and enable signals to be freely transmitted between the various user devices. Additionally, Universal Mobile Telecommunication Systems (UMTS) is an example of a 3G network, although there are other 3G network infrastructures that may implement the following methods and systems. Long Term Evolution (LTE) and Evolved High-Speed Packet Access (HSPA+) are examples of 4G networks, although there are other 4G network infrastructures that may implement the following methods and systems. 5G networks are the next generation of mobile networks that are designed to combine both an evolution and revolution of the existing LTE/LTE-A mobile networks.

In some examples, instructions 708 can cause processors 704 and transceivers 706 to perform operations that comprise the methods and signaling processes discussed above. These operations can include, but are not limited to, receiving a communication session invite that has been unanswered from a communications network and/or a bridge function associated with the communications network, identifying a voicemail system identifier based at least on a voicemail routing profile and an internal lookup table 710, obtaining the voicemail routing profile via a database access interface 712, and obtaining routing information for the unanswered communication session via a repository function interface 714. Additionally, instructions 708 may further cause operations that are described above with reference to FIGS. 1, 2, 3, 4, 5, and 6.

In some examples, internal lookup table 710 can be utilized to determine a voicemail system identifier for a voicemail routing profile. In particular, the voicemail routing profile can include voicemail profile information, such as a voicemail pilot number, that can be associated with the voicemail system identifier by the internal lookup table 710. Additionally, the network node 700 can receive the voicemail routing profile, determine the voicemail profile information, and compare the voicemail profile information to the internal lookup table 710. Accordingly, the internal lookup table 710 can be configured to determine, based at least on the voicemail routing profile associated with the unanswered communication session, the voicemail system information that can be submitted via the repository function interface 714 to identify the voicemail system for the unanswered communication session.

In some examples, a database access interface 712 can be configured to enable the network node 700 to access a database that stores the user profile and provisioning information for the user device. In particular, the database access interface 712 can be associated with user profiles for a plurality of user devices that have registered to a communication network. Additionally, the database access interface 712 can enable the network node 700 to access the user profiles for the plurality of user devices independent of the communication network that the plurality of user devices are registered to. Accordingly, the database access interface 712 can be configured to enable the network node 700 to obtain the voicemail routing profile for the unanswered communication session from the user profiles registered to the communication network and/or one or more additional communication networks.

In some examples, a repository function interface 714 can be configured to enable the network node 700 to access a repository function configured to return routing information for a voicemail system identified by the voicemail system identifier. In particular, the repository function interface 714 enables the network node 700 to submit the voicemail system identifier, receive the routing information for the voicemail system, and direct the unanswered communication session to the voicemail system. Additionally, the repository function interface 714 can isolate the network node 700 from the repository function such that the repository function and the voicemail system identified by the voicemail system identifier may be updated independent of the network node 700. Further, the repository function interface 714 enables the network node 700 to receive the routing information for the voicemail system based at least on a domain name server and a global traffic manager that is associated with a plurality of voicemail systems. Accordingly, the repository function interface 714 enables the network node 700 to route the unanswered communication session to the appropriate voicemail system and the appropriate voicemail datacenter based at least on the information stored within the repository function and the information acquired via the global traffic manager monitoring the plurality of voicemail systems.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining that a user device has registered with a communication network, the user device being associated with a user profile;
   determining, based at least on the user profile, a voicemail routing profile that is associated with the user device and a communication session originating from the user device;
   receiving, from the communication network, a communication session invite transmitted by the user device that is unanswered by a target device;
   determining, based at least on the communication session invite being unanswered, a voicemail system identifier that is associated with the voicemail routing profile;
   determining, based at least on the voicemail system identifier, routing information that is associated with the voicemail system; and
   routing, based at least on the routing information, the communication session invite to the voicemail system such that a voicemail is deposited by the user device via the voicemail system.

2. The method of claim 1, wherein:
   the communication network is an IP Multimedia Subsystem network;
   the voicemail routing profile comprises a voicemail pilot number,
   the communication session invite is a SIP invite;
   the voicemail system identifier is a Fully Qualified Domain Name; and
   the routing information is a virtual IP address for a load balancer of the voicemail system.

3. The method of claim 1, wherein determining the voicemail system identifier further comprises:
   accessing an internal lookup table that includes a set of voicemail system identifiers; and
   determining, based at least on the internal lookup table, that the voicemail pilot number is associated with the voicemail system identifier.

4. The method of claim 3, wherein the internal lookup table further comprises:
   the set of voicemail system identifiers associated with one or more user attributes that are stored by the voicemail routing profile; and
   the internal lookup table is configured to associate the voicemail system identifier with voicemail routing profiles containing the one or more user attributes such that the voicemail routing profiles are directed to the voicemail system.

5. The method of claim 1, wherein determining the routing information further comprises:
   transmitting, to a repository function, the voicemail system identifier associated with the communication session invite; and
   receiving, from the repository function, the routing information associated with the voicemail system.

6. The method of claim 5, wherein:
   the repository function is a Domain Name Server (DNS) that is associated with a Global Traffic Manager (GTM);
   the voicemail system identifier causes the DNS to request the routing information from the GTM; and
   the request causes the GTM to determine, based at least on a utilization of one or more voicemail systems, the routing information of the voicemail system.

7. The method of claim 1, wherein determining the voicemail routing profile further comprises:
   sending, to a database, a request for the voicemail routing profile that identifies the user profile associated with the user device; and
   receiving, from the database a response that provides the voicemail routing profile.

8. A system comprising:
   one or more processors;
   a memory; and
   one or more instructions stored in the memory and executable by the one or more processors to perform operations comprising:
   receiving, from a user device, a communication session invite that identifies a target device;
   transmitting the communication session invite to the target device;
   determining that the target device failed to establish a communication session with the user device in response to the communication session invite;
   routing the communication session invite to a network node configured to enable a voicemail to be deposited;

causing, based at least on the communication session invite, the network node to identify a voicemail routing profile associated with the user device;

transmitting, from the network node to a repository function, a query that includes a voicemail system identifier associated with the voicemail routing profile and causes the repository function to return routing information to the network node; and routing the communication session invite from the network node to a voicemail system associated with the voicemail system identifier such that a voicemail is deposited by the user device.

9. The system of claim 8, wherein:

the communication session invite is a SIP invite;

the voicemail system identifier is a Fully Qualified Domain Name;

the routing information is a virtual IP address for a load balancer of the voicemail system;

the network node is a Breakout Gateway Control Function; and the repository function is a Domain Name Server that is associated with a Global Traffic Manager.

10. The system of claim 8, wherein:

the network node, the repository function, and the voicemail system are associated with a first communication network; and the communication session invite is received from the user device via a second communication network.

11. The system of claim 10, wherein routing the communication session invite to the network node further comprises:

transmitting, to the second communication network, an indication that the communication session invite failed to establish the communication session with the target device;

causing a bridge function associated with the first communication network and the second communication network to obtain the voicemail routing profile associated with the user device; and transmitting, from the bridge function to the network node, the communication session invite.

12. The system of claim 8, wherein:

the network node, the repository function, and the voicemail system are associated with a first communication network;

the communication session invite is received from the user device via the first communication network; and the communication session invite is transmitted to the target device via a second communication network.

13. The system of claim 12, wherein routing the communication session invite to the network node further comprises:

transmitting, to the first communication network, an indication that the communication session invite failed to establish the communication session with the target device; and forwarding, based at least on the indication, the communication session invite to the network node.

14. The system of claim 8, wherein the repository function is associated with a voicemail load balancer configured to identify an available voicemail system for the voicemail based on at least one of:

one or more system utilizations associated with the voicemail system and one or more additional utilization, wherein the voicemail load balancer selects the voicemail system based on a system utilization of the voicemail system being less than a utilization threshold;

a sequence of voicemail systems, wherein the voicemail load balancer selects the voicemail system based on the voicemail system being indicated by the sequence of voicemail systems; or a randomizer function that identifies the voicemail system at random for the voicemail load balancer.

15. A method comprising:

generating, for a user profile and a services profile, a provisioning request that indicates one or more messaging services associated with the user profile and the services profile;

transmitting the provisioning request to a web services gateway;

causing the web services gateway to associate the user profile with the one or more messaging services within a subscriber database;

transmitting the provisioning request to a provisioning gateway;

causing the provisioning gateway to generate the voicemail routing services profile that is associated with the user profile based at least on a voicemail service that is included in the one or more messaging services; and storing the voicemail routing services profile within a database of a communication network, the database of the communication network configured to provide the voicemail routing services profile to a network node in response to a user device of the user profile registering with the communication network.

16. The method of claim 15, wherein causing the web services gateway to associate the user profile with the one or more messaging services further comprises:

determining, one or more user attributes that are provided to the web services gateway via the provisioning request;

causing, based at least on the one or more user attributes, the web services gateway to configure permissions for the one or more messaging services that are associated with the user profile via the subscriber database; and causing the web services gateway to provision one or more messaging services for the user profile.

17. The method of claim 16, wherein the user attributes further cause the web services gateway to allocate an amount of storage for the user profile associated with the one or more messaging services within a message store database.

18. The method of claim 15, wherein causing the provisioning gateway to generate the voicemail routing services profile further comprises:

determining the one or more messaging services include the voicemail service;

determining one or more user attributes associated with the voicemail service;

determining a user class that is associated with the user profile; and causing the provisioning gateway to generate the voicemail routing services profile based at least on the user class.

19. The method of claim 18, wherein the user class indicates a type of user and a type of services that can be accessed by the user profile, the user class indicating that the user profile is associated with at least one of a consumer user or an enterprise user.

20. The method of claim 18, wherein the user class is an indicator of a voicemail system that unanswered communication sessions from the user profile are routed to, the user class being associated with the voicemail system within a repository function of the communication network.

\* \* \* \* \*